(No Model.)
J. TUCKER.
PARIS GREEN DISTRIBUTER.
No. 433,426. Patented July 29, 1890.
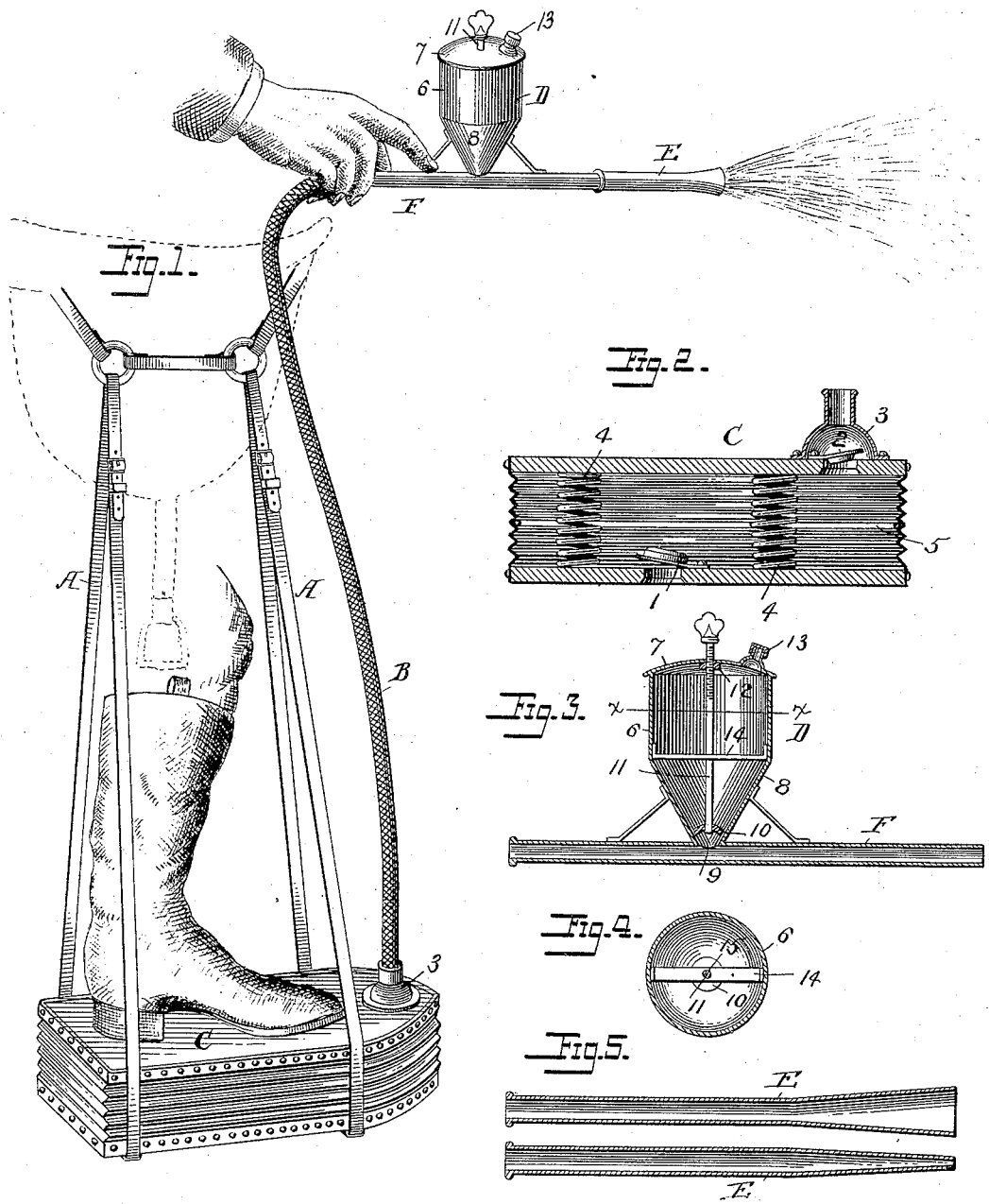
WITNESSES
INVENTOR
Joseph Tucker
By Foster & Freeman
Attorneys

UNITED STATES PATENT OFFICE.

JOSEPH TUCKER, OF NEAR ELYSIAN FIELDS, TEXAS, ASSIGNOR TO THE TUCKER POISON DISTRIBUTOR, COTTON WORM AND INSECT DESTROYING MACHINE COMPANY, (LIMITED,) OF SHREVEPORT, LOUISIANA.

PARIS-GREEN DISTRIBUTER.

SPECIFICATION forming part of Letters Patent No. 433,426, dated July 29, 1890.

Application filed March 8, 1890. Serial No. 343,213. (No model.)

*To all whom it may concern:*

Be it known that I, JOSEPH TUCKER, a citizen of the United States, residing near Elysian Fields, in the county of Harrison, State of Texas, have invented certain new and useful Improvements in Devices for Distributing Insect-Powder, of which the following is a specification.

My invention relates to insect-destroyers; and it consists in a device for dusting powder upon plants, which is especially adapted to be operated by persons while in a sitting position upon vehicles or animals.

In the accompanying drawings, in which like parts are indicated by similar letters throughout the several views, Figure 1 is a perspective view of my distributer. Fig. 2 is a longitudinal central sectional view of the bellows or blower. Fig. 3 is a sectional view of the hopper. Fig. 4 is a section on the line *x x* of Fig. 3, and Fig. 5 shows two forms of nozzles which may be used.

In distributing powder for the purpose of destroying the insects and diseases which prey upon vegetation it has been usual heretofore to employ devices which were adapted to be operated by hand or attached to some wheeled vehicle and connected to be operated by the axles or other moving parts. The operation of the former class of machines for any considerable length of time is laborious and tiresome, and, moreover, as the hands are needed to operate the mechanism, it becomes difficult to direct the powder to the infested plants and keep it off of the operator. Wheeled vehicles for this purpose are expensive and difficult to use in some kinds of crops.

I prefer to arrange my improved distributer in connection with a seat or saddle, so that it can be operated by the foot or feet of the rider, thus leaving his hands free to manage the horse or other motor and to direct the nozzle from which the powder issues. This object may be attained in various ways, and it is to be understood that I do not limit myself to the precise construction which I have chosen to illustrate the principle of my invention.

In the drawings, C is a bellows attached to a seat or saddle by straps A in such manner as to be adapted to be operated by the foot of the rider.

B is a flexible tube leading from the bellows to the nozzle E, and D is a hopper or holder for the powder to be distributed.

The blower may be of any desired form; but I prefer the one shown, which is in the form of an accordion-bellows having inlet and outlet valves 1 2, the latter communicating with the tube B by means of the funnel-shaped valve-cover 3. Springs 4 4 are placed within the blower to distend it, and a wire frame 5 may be inserted to assist in preserving its form.

The hopper D may be placed at any convenient point between the blower and the nozzle. As shown, it is mounted upon a rigid piece of tubing F, to which the nozzle E is also attached. It is composed of a cylindrical body 6, having a cover 7, and an inverted cone-shaped bottom 8, communicating at 9 with the pipe F. The discharge-orifice 9 is controlled by a valve 10 upon the end of a rod 11. The rod 11 is screw-threaded and the valve may be adjusted by turning the rod within the correspondingly-threaded nut 12, which is attached to the cover or other fixed part of the hopper. A transverse brace 14 is arranged across the interior of the hopper and perforated at 15 to receive and guide the valve-rod 11. An opening covered by a threaded cap 13 is provided in the top or cover 7, through which to charge the hopper with powder.

In Fig. 5 I have shown two forms of nozzles which may be used with my improved device, according to the effect desired to be produced and the kind and quality of powder used.

It will be obvious that instead of applying the foot directly to the blower I may arrange it nearer to or upon the saddle and operate it by a strap or pitman connected to an ordinary stirrup. Moreover, I may employ connections from the blower to both feet, or use a separate bellows under each foot, so as to discharge air through a single nozzle.

In operating my invention the hopper is filled with the powder to be distributed and the device properly adjusted to the saddle or seat. The rider then takes his seat, operates the blower with his foot or feet, and directs the nozzle with his hand, the rate at which the powder is delivered being regulated by the valve 10.

An important feature of my invention is that the discharge-nozzle is under complete control, and can be pointed in the direction in which the wind is blowing, so that the wind will always carry the poisonous powder away from the horse and rider.

Having described my invention, what I claim, and desire to protect by Letters Patent, is—

1. The combination, in a device for distributing insect-powder, of a blower arranged to be actuated by the foot of the rider, and connections from the saddle to the blower to support the latter, substantially as described.

2. The combination, in a device for distributing insect-powder, of a blower suspended from the saddle in position to be operated by the foot of the rider, a tube leading from the bellows, and a hopper communicating with the tube, substantially as described.

JOSEPH TUCKER.

Witnesses:
R. L. HIGHTOWER,
J. M. TROSPER.